United States Patent [19]
Klett

[11] Patent Number: 5,605,757
[45] Date of Patent: Feb. 25, 1997

[54] GLASS FIBER SIZING COMPOSITIONS, SIZED GLASS FIBERS AND METHODS OF REINFORCING POLYMERIC MATERIALS USING THE SAME

[75] Inventor: Michael W. Klett, Pittsburgh, Pa.

[73] Assignee: PPG Industries, Inc., Pittsburgh, Pa.

[21] Appl. No.: 359,778

[22] Filed: Dec. 20, 1994

Related U.S. Application Data

[63] Continuation-in-part of Ser. No. 186,963, Jan. 27, 1994, abandoned.

[51] Int. Cl.$^6$ ............................... B32B 9/00; B05D 3/00
[52] U.S. Cl. ..................... 428/392; 428/375; 428/378; 428/391; 528/76; 528/104; 525/29; 525/32; 524/512; 427/384; 427/386
[58] Field of Search ............... 528/76, 104; 523/402, 523/412, 415; 525/29, 32, 101; 524/562; 428/391, 378, 375, 392; 65/3.41, 3.43, 3.44; 427/372.2, 384, 386, 389.7

[56] References Cited

U.S. PATENT DOCUMENTS

| | | | |
|---|---|---|---|
| 3,424,719 | 1/1969 | Masters | 260/47 |
| 3,935,344 | 1/1976 | Haggerty et al. | 428/378 |
| 3,936,285 | 2/1976 | Maaghul | 65/3 C |
| 4,029,623 | 6/1977 | Maaghul | 260/29.6 RW |
| 4,038,243 | 7/1977 | Maaghul | 260/40 R |
| 4,049,865 | 9/1977 | Maaghul | 428/391 |
| 4,248,935 | 2/1981 | Temple | 428/391 |
| 4,271,229 | 6/1981 | Temple | 428/288 |
| 4,309,326 | 1/1982 | Sage et al. | 260/29.6 NR |
| 4,338,233 | 7/1982 | Das et al. | 523/410 |
| 4,338,234 | 7/1982 | Moore et al. | 523/206 |
| 4,341,877 | 7/1982 | Das et al. | 523/409 |
| 4,358,501 | 11/1982 | Temple | 428/268 |
| 4,370,157 | 1/1983 | Barch et al. | 65/3.43 |
| 4,370,439 | 1/1983 | Melle et al. | 524/513 |
| 4,374,177 | 2/1983 | Hsu et al. | 429/392 |
| 4,394,418 | 7/1983 | Temple | 428/391 |
| 4,394,475 | 7/1983 | Temple et al. | 524/262 |
| 4,410,645 | 10/1983 | Das et al. | 523/206 |
| 4,423,201 | 12/1983 | Hicks | 528/76 |
| 4,435,474 | 3/1984 | Das et al. | 428/391 |
| 4,457,970 | 7/1984 | Das et al. | 428/290 |
| 4,477,496 | 10/1984 | Das et al. | 427/375 |
| 4,504,619 | 3/1985 | Chang et al. | 524/524 |
| 4,518,653 | 5/1985 | McWilliams et al. | 429/378 |
| 4,530,860 | 7/1985 | Johnson | 427/386 |
| 4,608,304 | 8/1986 | Rosthauser | 428/378 |
| 4,615,946 | 10/1986 | Temple | 428/361 |
| 4,637,956 | 1/1987 | Das et al. | 428/391 |
| 4,728,573 | 3/1988 | Temple | 428/378 |
| 4,745,028 | 5/1988 | Das et al. | 428/391 |

(List continued on next page.)

FOREIGN PATENT DOCUMENTS

WO93/01235  1/1993  WIPO .

OTHER PUBLICATIONS

SC: 21–94, "Shell Resins and Related Products Physical Properties Guide", Shell Chemical Company.
"EPI–REZ 5520–W–60 Waterborne Resin", Technical Bulletin of Shell Chemical Co., 1994.

Primary Examiner—Pamela R. Schwartz
Assistant Examiner—J. M. Gray
Attorney, Agent, or Firm—Ann Marie Odorski

[57] ABSTRACT

An aqueous glass fiber sizing composition is provided which provides high strength and wet-out to composites prepared using glass fibers having the sizing composition of the present invention applied thereto. When used to reinforce a thermosetting polymeric material, the glass fibers sized with this composition provide a composite useful in making pultrusion profiles having high compressive, shear and flexural strengths. The aqueous composition includes a non-ionic thermosetting urethane-modified epoxy polymer; a water soluble, dispersible or emulsifiable epoxy film-forming polymer different from the urethane-modified epoxy polymer; an emulsifying agent; an organo functional silane coupling agent; and a fiber lubricant.

32 Claims, 1 Drawing Sheet

U.S. PATENT DOCUMENTS

| | | | |
|---|---|---|---|
| 4,752,527 | 6/1988 | Sanzero et al. | 428/391 |
| 4,789,593 | 12/1988 | Das | 428/391 |
| 4,795,678 | 1/1989 | Girgis | 428/391 |
| 5,038,555 | 8/1991 | Wu et al. | 57/249 |
| 5,077,325 | 12/1991 | Akutagawa et al. | 523/428 |
| 5,085,938 | 2/1992 | Watkins | 428/378 |
| 5,219,656 | 6/1993 | Klette et al. | 428/378 |
| 5,258,227 | 11/1993 | Gaa et al. | 428/392 |

FIG. 1

GLASS FIBER SIZING COMPOSITIONS, SIZED GLASS FIBERS AND METHODS OF REINFORCING POLYMERIC MATERIALS USING THE SAME

RELATED APPLICATION

This patent application is a continuation-in-part of U.S. patent application Ser. No. 08/186,963, filed Jan. 27, 1994, now abandoned.

FIELD OF THE INVENTION

The present invention relates to sizing compositions which can be applied to glass fibers, sized glass fibers and methods of reinforcing polymeric materials using the same. More particularly, the present invention relates to aqueous sizing compositions for application to glass fibers used in reinforcing thermosetting polymeric composites, such as filament wound composites or pultrusions.

BACKGROUND OF THE INVENTION

Glass fibers are typically produced by drawing molten glass at a high rate of speed from tips of small orifices in a precious metal device or bushing. During the forming and subsequent mechanical and treatment processes, the glass fibers can be broken by contact with each other and processing equipment (i.e., a process known as filamentization). These broken glass fibers (fuzz) can accumulate on processing equipment and/or produce an undesirable non-uniform surface on polymeric articles to which the glass fibers are added.

To protect the glass fibers from interfilament abrasion, a sizing composition is applied to the surface of the glass fibers during the forming process. Typical sizing compositions include components such as film-formers, lubricants, coupling agents and emulsifiers. Generally, the sizing composition is applied to a glass fiber strand subsequent to the drawing process and prior to gathering of a plurality of continuous strands on a forming package. The forming packages are typically dried to remove moisture and cure the sizing composition.

Glass fibers can be incorporated into polymeric materials by filament winding, pultrusion, and other processes for forming high strength glass fiber reinforced molding composites. Pultruded profiles are commonly used in corrosion resistant applications in which corrosion resistance, electrical resistance and high strength are desired. Examples of pultruded products include architectural and automotive products, ladder rails, sucker rods, antennas, railings, conduits, I-beams, H-beams, angles, insulator rods, floor gratings and roadway delineators.

The strength of molded products formed from materials produced by the above processes is dependent in part upon the degree of contact between the polymer and fiber glass. The measure of the flowability of the polymeric matrix material through the glass fiber mass to obtain essentially complete encapsulation of the entire surface of each glass strand by the polymeric material is referred to as "wet-out". Incomplete wet-out during this initial processing can adversely affect subsequent processing as well as the surface characteristics of the final composite. For example, poor wet-out can manifest itself as low composite strengths and the fibers can appear white in the composite.

It is desirable to have optimum wet-out and compatibility of the glass fibers with the thermosetting matrix resin in applications such as those discussed above.

SUMMARY OF THE INVENTION

One aspect of the present invention is an aqueous sizing composition for coating a plurality of glass fibers adapted for reinforcing a thermosetting polymer, the composition comprising: (a) a non-ionic thermosetting urethane-modified epoxy polymer; (b) a water soluble, dispersible or emulsifiable epoxy film-forming polymer different from the urethane-modified epoxy polymer and adapted to emulsify the urethane-modified epoxy polymer of (a); (c) an organo functional silane coupling agent; and (d) a fiber lubricant.

In another aspect of the present invention the aforesaid aqueous sizing composition comprises (a) a non-ionic thermosetting urethane-modified epoxy polymer; (b) a water soluble, dispersible or emulsifiable epoxy film-forming polymer different from the urethane-modified epoxy polymer; (c) an emulsifying agent; (d) an organo functional silane coupling agent; and (e) a fiber lubricant.

Yet another aspect of the present invention is a method of making a reinforcement for a variety of thermosetting polymers, such as epoxy, polyester and vinyl ester resins, having improved strength. An aqueous sizing composition according to the present invention is applied to at least a portion of a surface of each of a plurality of glass fibers, which are then dried to form a reinforcement for a thermosetting polymer.

BRIEF DESCRIPTION OF THE DRAWING

The foregoing summary, as well as the following detailed description of the invention, will be better understood when read in conjunction with the appended drawing. In the drawing.

DETAILED DESCRIPTION OF THE INVENTION

The aqueous sizing compositions of the present invention can be readily applied to a plurality of glass fibers to provide among other advantages: good solubility in a thermosetting matrix polymer for high wet-out, good compatibility with the thermosetting matrix polymer and good clarity in resultant cured polymer pultrusions. Articles formed from thermosetting polymeric materials incorporating glass fibers treated with the sizing composition of the present invention have improved strength and clarity.

The aqueous sizing compositions of the present invention comprise one or more non-ionic thermosetting urethane-modified epoxy polymers, preferably present in the form of an aqueous emulsion or dispersion. Generally, the urethane-modified epoxy polymer has an epoxide equivalent weight of about 175 to about 4000, more preferably about 175 to about 1000 and most preferably about 175 to about 760. The urethane-modified epoxy polymer generally comprises about 50 to about 99 weight percent and, more preferably, about 60 weight percent of an aqueous emulsion which preferably contains no organic solvents. The epoxide equivalent weight or epoxide equivalent is defined as the weight of resin or polymer in grams which contains one gram equivalent of epoxy.

The urethane-modified epoxy polymer contains hydroxyl functionality and at least one epoxy or oxirane group in the molecule. Halogen and ether substituents can also be present. The urethane-modified epoxy polymers suitable herein can be broadly categorized as aliphatic, aromatic, cyclic, acyclic, alicyclic, heterocyclic or mixtures thereof.

It is believed that the non-ionic thermosetting urethane-modified epoxy polymer can be the reaction product of (1) epoxy and hydroxy functional polyglycidyl ethers of polyhydric alcohols or thiols and (2) polyfunctional isocyanate containing materials.

Useful epoxy and hydroxy functional polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide.

Useful epihalohydrins include epibromohydrin, dichlorohydrin and epichlorohydrin, which is believed to be preferred.

Polyhydric alcohols and thiols useful in the present invention can be aromatic, aliphatic, cycloaliphatic, heterocyclic or mixtures thereof.

Non-limiting examples of aromatic polyhydric alcohols include phenols which are preferably at least dihydric phenols. The dihydric phenols preferably contain two phenolic hydroxyl groups and no other groups reactive with epoxide groups or isocyanate groups. Non-limiting examples of aromatic polyhydric alcohols useful in the present invention include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 4,4'-isopropylidenediphenol, i.e., bisphenol A. Bisphenol A is believed to be a preferred polyhydric alcohol.

Non-limiting examples of epoxy and hydroxy functional polyglycidyl ethers of bisphenol A include EPON® resins 1001F, 1002F, 1004F, 1007F and 1009F, each of which is commercially available from Shell Chemical Co. of Houston, Tex. The characteristics of each of these EPON® resins are set forth in "Shell Resins and Related Products Physical Properties Guide", Technical Bulletin of Shell Chemical Company of Houston, Tex. (May 1994) and are included below in Table 1.

TABLE 1

| | EPON ® Resin | | | | |
|---|---|---|---|---|---|
| | 1001 F. | 1002 F. | 1004 F. | 1007 F. | 1009 F. |
| Solution Viscosity (cp) | 7.0–9.6 | 9.2–13.6 | 15–25 | 50–100 | 100–250 |
| Color | 200 | 200 | 200 | 200 | 200 |
| Weight per Epoxide | 525–550 | 600–700 | 800–950 | 1700–2300 | 2300–3800 |
| Melt Viscosity (poise at 150° C.) | 6–9 | 12–25 | — | >500 | >500 |
| Melt Point (°C.) | 75–80 | 85–90 | — | 120–130 | 130–140 |
| Density (g/ml) | 1.20 | 1.20 | 1.20 | 1.19 | 1.19 |

In Table 1, the solution viscosity was measured in a 40% by weight solution in methyl ethyl ketone using Shell Test Method HC-688B-85; the maximum platinum cobalt color was measured in a 40% by weight solution in methyl ethyl ketone using ASTM test method D 1209-84; the weight per epoxide was measured by Shell Test Method HC-427D-89 (Perchloric Acid Method); the melt viscosity at 150° C. was determined using Shell Test Method HC-710-86 (Brookfield Thermosel System); and the density was determined at 25° C. using Procedure #4 of the Powder Coating Institute.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof.

An example of a suitable cycloaliphatic alcohol is cyclohexanedimethanol.

Polyfunctional isocyanate containing materials useful in the present invention can be aromatic, aliphatic or cycloaliphatic, heterocyclic or mixtures thereof.

Non-limiting examples of suitable aromatic polyfunctional isocyanate containing materials include polyfunctional isocyanates such as toluene diisocyanate, phenylene diisocyanate, dianisidine diisocyanate, diisocyanatodiphenyl methane, bis(p-phenyl isocyanate), bis(p-phenyl) methylene diisocyanate, bis(p-phenyl cyclohexyl) methylene diisocyanate and naphthalene diisocyanate.

Other useful polyisocyanates include xylylene diisocyanate and tetramethylxylylene diisocyanate (such as TMXDI, which is commercially available from Cyanamid of Wayne, N.J.), which can be broadly categorized as aliphatic and/or aromatic.

Useful cycloaliphatic isocyanates include cyclohexane diisocyanate, hexamethylene diisocyanate, isophorone diisocyanate and dicyclohexylmethane-4,4'diisocyanate (which is commercially available as DESMODUR W from Miles, Inc. of Pittsburgh, Pa.). Isophorone diisocyanate is believed to be a preferred polyfunctional isocyanate containing material.

An example of a suitable triisocyanate is DESMODUR N3300 (which is commercially available from Miles, Inc.).

The polyfunctional isocyanate containing materials can also be in the form of isocyanate functional prepolymers prepared, for example, by the reaction of (1) a mono-, di-, or poly hydroxy functional material such as a polyester or polyether and (2) polyisocyanates such as those disclosed above. For example, a suitable isocyanate functional prepolymer can be prepared by reacting appropriate proportions of a dihydric phenol with a polyisocyanate and a long-chain, aliphatic polyether glycol such as is disclosed in U.S. Pat. No. 4,423,201, which is hereby incorporated by reference.

The epoxy and hydroxy functional polyglycidyl ether and polyfunctional isocyanate containing materials are generally reacted in the ratio of about 0.01 to about 1.0 isocyanate group per mole of polyglycidyl ether with the ratio of isocyanate groups to hydroxyl groups present in the polyglycidyl ether being no more than one.

It is believed that non-ionic thermosetting urethane-modified epoxy polymers useful in the present invention can be prepared from the materials exemplified above by methods known to those skilled in the art. Reference is made to the general teachings of U.S. Pat. No. 3,424,719, and more particularly col. 1, line 30—col. 6, line 22 which are incorporated by reference herein.

Solvents which preferably do not react with epoxy or isocyanate groups can be used in the reaction process to lower the viscosity and facilitate mixing and handling of the reactants. Solvents believed to be useful include toluene, xylene, methyl ethyl ketone, methyl isobutyl ketone and ethyl acetates.

The non-ionic thermosetting urethane-modified epoxy polymer is preferably in the form of an emulsion. The material EPI-REZ® CMD 5520-W-60, which is commercially available from Shell Chemical Co. of Houston, Texas, is a preferred emulsion. This material is a non-ionic, aqueous dispersion of a thermosetting urethane-modified epoxy resin which has a weight per epoxide of about 480–560 (determined by Shell Test Method HC-427D-89) and about 60 weight percent solids. The CMD W60-5520 dispersion is thixotropic, contains no organic solvents and has epoxy functionality and hydroxyl functionality. The dispersion has a viscosity of about 12,000 centipoise at 25° C. as measured using a Brookfield Model RVT, No. 5 spindle at 10 rpm; a density of about 9.2 lb./gal; an average particle size of about 2 microns; a pH of about 4.0; and a vapor pressure at 20° C. of less than about 20 mm Hg. See "Shell Resins EPI-REZ® CMD 5520-W-60 Waterborne Resin", Technical Bulletin of Shell Chemical Company (April 1994) .

Figure 1:
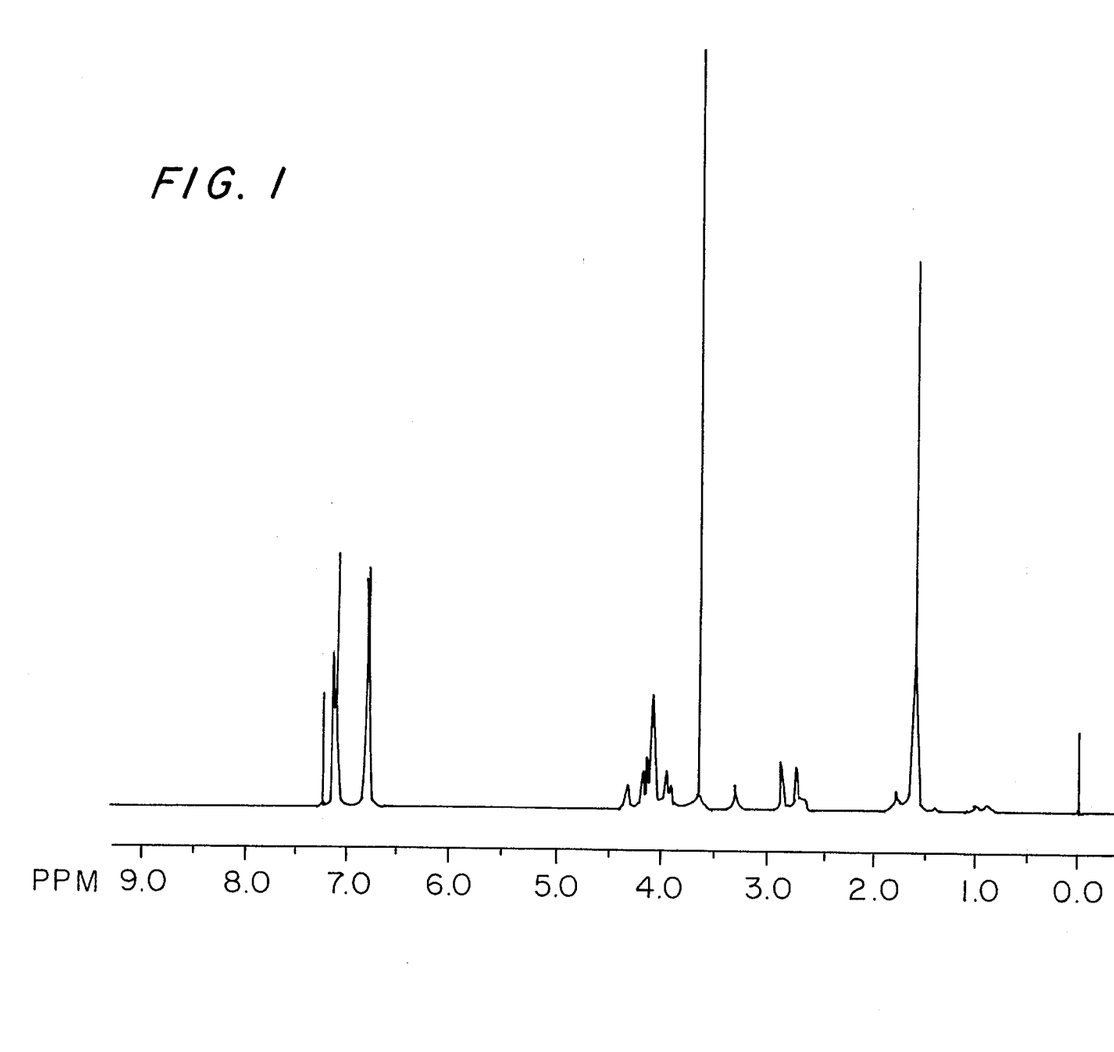
FIG. 1 is a proton nuclear magnetic resonance ('HNMR) curve for an aqueous emulsion of a non-ionic thermosetting urethane-modified epoxy polymer which is commercially available under the trade designation EPI-REZ® CMD 5520-W-60 from Shell Chemical, in accordance with the present invention.

A proton nuclear magnetic resonance ('HNMR) curve for EPI-REZ® CMD W60-5520 is shown in FIG. 1. The 'HNMR was performed on a Bruker 300 MHz proton NMR spectrometer with a zero reference of tetramethylsilane (TMS), an ambient sample temperature and with deutero chloroform solvent.

Preferably, the non-ionic thermosetting urethane-modified epoxy polymer comprises about 10 to about 60 weight percent of the sizing composition on a total solids basis and, more preferably, about 35 to about 55 weight percent.

The aqueous sizing composition of the present invention also comprises one or more water soluble, dispersible or emulsifiable epoxy film-forming polymers different from the urethane-modified epoxy polymer. The epoxy film-forming polymer need not have hydroxyl functionality although it can and preferably is not urethane-modified. Suitable epoxy film-forming polymers contain at least one epoxy or oxirane group in the molecule, as set forth above in formula (I).

Epoxy film-forming polymers useful in the present invention include, for example, epoxy and hydroxy functional polyglycidyl ethers of polyhydric alcohols or thiols such as are discussed in detail above; the reaction of monoepoxy compounds with themselves; or other epoxy generating compounds, for example unsaturated monoepoxy compounds which can be homopolymerized to produce a polyepoxy polymer such as a poly(allyl glycidyl ether).

Examples of suitable commercially available epoxy film-forming polymers are EPON® 826, 828 and 880 epoxy resins, which are epoxy functional polyglycidyl ethers of bisphenol A prepared from bisphenol-A and epichlorohydrin and are commercially available from Shell Chemical. Other examples of useful epoxy film-forming polymers are set forth in U.S. Pat. No. 4,752,527 of Sanzero et al., which is hereby incorporated by reference.

Aqueous emulsions or dispersions of the epoxy and hydroxy functional polyglycidyl ethers described above can be prepared with the aid of surfactants and emulsifiers to form emulsions or dispersions. Examples of such emulsions include EPI-REZ® CMD 35201, which is commercially available from Shell Chemical, and ARALDITE® XU GY 281 which is commercially available from Ciba Geigy of New York.

The epoxy film-forming polymer generally has an epoxy equivalent weight of about 170 to about 1000, preferably about 175 to about 760 and, more preferably, about 180 to about 220.

Preferably, the epoxy film-forming polymer comprises about 10 to about 55 weight percent of the sizing composition on a total solids basis and, more preferably, about 15 to about 40 weight percent. The ratio on a total solids basis of non-ionic thermosetting urethane-modified epoxy polymer to epoxy film-forming polymer is generally about 30:70 to about 80:20 by weight and, more preferably, about 50:50 to about 75:25.

The aqueous sizing composition of the present invention also preferably comprises one or more emulsifying agents or surfactants for emulsifying the urethane-modified epoxy polymer and/or the epoxy film-forming polymer. Preferably, a combination of surfactants are used as the emulsifying agents, examples of which include a polyoxyalkylene block copolymer such as a polyoxypropylene-polyoxyethylene copolymer, an ethoxylated alkyl phenol, a polyoxyethylene octylphenyl glycol ether, an ethylene oxide derivative of a sorbitol ester and/or a polyoxyethylated vegetable oil.

An example of a suitable polyoxypropylene-polyoxyethylene copolymer is the material PLURONIC™ F-108 which is commercially available from BASF Corporation of Parsippany, N.J. This material is a condensate of ethylene oxide with hydrophobic bases formed by condensation with propylene oxide with propylene glycol. Examples of useful ethoxylated alkyl phenols include ethoxylated octylphenoxyethanol, phenoxy polyethylene-oxy(ethanol), phenoxy-(ethyleneoxy)ethanol and nonyl phenoxy poly(ethyleneoxy)ethanol. An example of a commercially available ethoxylated octylphenoxyethanol is IGEPAL CA-630 from GAF Corporation of Wayne, N.J. An example of a polyoxyethylated vegetable oil is EMULPHOR EL-719, which is commercially available from GAF Corp. A useful polyoxyethylene octylphenyl glycol ether is TRITON X-100, which is commercially available from Rohm & Haas of Philadelphia, Pa. Tween 81 is an example of a useful ethylene oxide derivative of a sorbitol ester.

Other examples of suitable emulsifying agents include non-ionic epoxide polyols such as NOVEPOX™ or PROX E 117, which are commercially available from Synthron, Inc.

The preferred emulsifying agent is a blend of about 1:1 to about 4:1 of a polyoxypropylene-polyoxyethylene copolymer (PLURONIC™ F-108) and an ethoxylated octylphenoxyethanol (IGEPAL CA-630). More preferably, the ratio of a polyoxypropylene-polyoxyethylene copolymer to ethoxylated octylphenoxyethanol is about 2:1. Generally, the emulsifying agent comprises about 5 to about 25 weight percent of the sizing composition on a total solids basis and, more preferably, about 15 to about 20 weight percent.

Alternatively, the epoxy film-forming polymer can act as an emulsifying agent or surfactant for the urethane-modified epoxy polymer. In this embodiment, the epoxy film-forming polymer should contain requisite functionality adapted for this purpose, as is well appreciated by one skilled in the art.

The sizing compositions of the present invention also comprise an organo functional silane coupling agent. Mixtures of coupling agents can be used, and preferably a mixture of three organo functional silane coupling agents is used. The organo functional silane coupling agent preferably has dual functionality. Each metal or silicon atom has attached to it one or more hydrolyzable groups which can react with the glass surface to remove hydroxyl groups and one or more groups which can react with the thermosetting urethane-modified epoxy polymer or epoxy film-forming polymer to form a chemical bridge between the glass surface and the polymer. Examples of hydrolyzable groups include:

the monohydroxy and/or cyclic $C_2$–$C_3$ residue of a 1,2- or 1,3-glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of groups reactive with the thermosetting urethane-modified epoxy polymer or epoxy film-forming polymer include epoxy, glycidoxy, mercapto, cyano, allyl, urethano, halo, isocyanato, ureido, imidazolinyl, vinyl, acrylato, methacrylato, amino or polyamino groups.

Examples of useful organo functional silane coupling agents include 3-amino-propyldimethylethoxysilane, gamma-aminopropyltriethoxysilane, gamma-aminopropyltrimethoxysilane, beta-aminoethyltriethoxysilane, N-beta-aminoethylamino-propyltrimethoxysilane, gamma-isocyanatopropyltriethoxysilane, vinyl-trimethoxysilane, vinyltriethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexylethyltrimethoxysilane, ureidopropyltrimethoxysilane, ureidopropyltriethoxysilane, chloropropyltrimethoxysilane, and chloropropyltriethoxysilane.

Preferably, the organo functional silane coupling agent is a mixture of epoxy (preferably A-187 gamma-glycidoxypropyltrimethoxysilane), methacrylate (preferably A-174 gamma-methacryloxypropyltrimethoxysilane) and amino silane (preferably A-1100 gamma-aminopropyltriethoxysilane) coupling agents, each of which is commercially available from Union Carbide Corporation. Other examples of amino silane coupling agents are set forth in U.S. Pat. No. 4,374,177 and K. Loewenstein, *The Manufacturing Technology of Continuous Glass Fibres* at page 263 (2d Ed. New York 1983), each of which is hereby incorporated by reference. One skilled in the art would appreciate that a number of organo silane coupling agents can be used in the aqueous sizing composition of the present invention and the above are only exemplary.

The organo functional silane coupling agent generally comprises about 5 to about 25 weight percent of the sizing composition on a total solids basis. Preferably, the sizing composition comprises about 5 to about 15 weight percent gamma-methacryloxypropyltrimethoxysilane, zero to about 8 weight percent gamma-glycidoxypropyltrimethoxysilane and about 0.1 to about 1.5 weight percent gamma-aminopropyltriethoxysilane on a total solids basis. More preferably, about 7 to about 11 weight percent gamma-methacryloxypropyltrimethoxysilane, 3 to about 5 weight percent gamma-glycidoxypropyltrimethoxysilane and about 0.3 to about 1.0 weight percent gamma-aminopropyltriethoxysilane on a total solids basis are included in the sizing composition.

The fiber lubricant can be any cationic, non-ionic or anionic glass fiber lubricant compatible with the other additives which reduces the interfilament abrasion between the fibers. Preferably, the fiber lubricant is selected from an amine salt of a fatty acid (which can, for example, include a fatty acid moiety having 12 to 22 carbon atoms and/or tertiary amines having alkyl groups of 1 to 22 atoms attached to the nitrogen atom), alkyl imidazoline derivative (such as can be formed by the reaction of fatty acids with polyalkylene polyamines), acid solubilized fatty acid amide (for example, saturated or unsaturated fatty acid amides having acid groups of 4 to 24 carbon atoms such as stearic amide) and acid solubilized polyunsaturated fatty acid amide. Other useful fiber lubricants are disclosed in Loewenstein at page 277, which is hereby incorporated by reference.

More preferred are the fiber glass lubricants selected from (1) a condensate of a fatty acid and polyethylene imine and (2) an amide substituted polyethylene imine, such as EMERY 6717, a partially amidated polyethylene imine commercially available from Henkel Corporation of Kankakee, Ill. Other examples of suitable EMERY fiber lubricants are the products designated 6760 and 4046D (cationic fatty acid amide). Preferably, the fiber lubricant comprises about 0.05 to about 0.5 weight percent, and more preferably about 0.05 to about 0.18 weight percent, of the sizing composition on a total solids basis.

The sizing composition can also include an aqueous- or non-aqueous-based plasticizer. Examples of suitable non-aqueous-based plasticizers include alkyl phthalates, such as di-n-butyl phthalate; alkyl trimellitates, such as trioctyl trimellitate; and alkyl adipates, such as dioctyl adipate. An example of an aqueous-based plasticizer is Carbowax 400, a polyethylene glycol which is commercially available from Union Carbide Co. of Danbury, Conn. The preferred plasticizer is di-n-butyl phthalate. Other useful plasticizers are disclosed in Loewenstein at page 275, which is hereby incorporated by reference. The amount of plasticizer can be about 0 to about 10 weight percent of the sizing composition on a total solids basis. Preferably, the amount of plasticizer is about 3 to about 5 weight percent of the sizing composition on a total solids basis.

The aqueous sizing composition can further comprise an organic acid in an amount sufficient to provide the aqueous sizing composition with a pH of about 3 to about 5.5. Non-limiting examples of organic acids suitable for use in the present invention include mono- and polycarboxylic acids and anhydrides thereof, where they exist, such as acetic, formic, propionic, caprioc, lactic, benzoic, pyruvic, oxalic acid, maleic, fumaric, acrylic, methacrylic acids and mixtures thereof.

Water (preferably deionized) is included in the aqueous sizing composition in an amount sufficient for application of the sizing composition to the plurality of glass fibers. Preferably, the weight percentage of solids is about 1 to about 10 weight percent of the aqueous sizing composition and, more preferably, about 4 to about 5 weight percent. The total amount in weight percent of the solid components equals about 100 percent. The total amount of solid and non-solid components is also about 100 weight percent.

The aqueous sizing composition of the present invention can be prepared by any suitable method well known to those skilled in the art. Preferably, each component is diluted in deionized water in a separate tank and well mixed before being combined with the other components in a main mixing tank. The organo functional silane coupling agent(s) can be at least partially hydrolyzed by reaction with the organic hydrocarbon acid in the presence of water. After each of the premixed ingredients is added to the main mix tank, sufficient water is added to provide the aqueous sizing composition with a total solids content of about 1 to about 10 weight percent as mentioned above.

The aqueous sizing composition of the present invention can be applied to any type of fiberizable glass composition known to those skilled in the art. Nonexclusive examples of suitable fiberizable glass compositions include "E-glass", "621-glass", "A-glass", "C-glass", "S-glass" and fluorine- and/or boron-free derivatives thereof. "E-glass" is the preferred glass composition for use in the present invention.

Preferably, the aqueous sizing composition of the present invention is applied to green glass having a refractive index of about 1.555 during the formation of the glass fibers. The glass fibers typically have diameters ranging from about $10.3 \times 10^{-5}$ to about $97.5 \times 10^{-5}$ inches (about $2.62 \times 10^{-3}$ to about $2.48 \times 10^{-2}$ mm) or more, and preferably about $50 \times 10^{-5}$ to about $90 \times 10^{-5}$ inches (about $1.27 \times 10^{-2}$ to about $2.29 \times 10^{-2}$ mm) for fibers to be used in pultruded products. The glass fibers can be produced as direct draw or multi-end rovings. The direct draw process is generally used to produce K through T diameter fibers, such as T-113, T-250 and K-675. Multi-end rovings are formed from a plurality of fibers, each fiber typically having a diameter of about $50 \times 10^{-5}$ inches ($1.27 \times 10^{-2}$ mm), and are assembled by a conventional roving process to produce a roving having the desired number of fibers therein.

The aqueous sizing composition is generally applied by contacting at least a portion of each glass fiber emanating from a bushing with a roller-type applicator bearing the sizing composition or by any method well known to those skilled in the art.

The fibers having the sizing composition applied thereto are usually gathered together to form a strand of a plurality of fibers. The strand is generally wound onto a forming package placed on a rotating collet, removed from the collet and dried in an oven at a temperature of about 220° F. (104° C.) to about 300° F. (149° C.) for about 10 to about 13 hours to produce glass fiber strands having a dried residue of the sizing composition thereupon. The drying temperature will depend upon such variables as the percentage of solids in the sizing composition, components of the sizing composition and type of glass fiber. The sizing composition provides glass fiber strand having about 0.3 to about 2.0 weight percent of the dried sizing composition on the strand based upon total weight of the glass and dried sizing composition.

The strands are typically transferred from the forming package and combined with a plurality of other strands to form a roving. The roving can be used in the form of continuous strands, woven glass fiber strand mat or chopped glass fibers to reinforce a thermosetting polymer, as desired, by any method known in the art, for example by pultrusion, filament winding and panel formation processes.

Glass fibers having the sizing composition of the present invention applied thereto can be used to reinforce a wide variety of thermosetting polymers. Nonexclusive examples of suitable thermosetting polymers include polyesters such as AROPOL 2036, which is commercially available from Ashland Chemical Inc. of Columbus, Ohio; polyesters formed from orthophthalic or isophthalic acid and a suitable alcohol, acrylic modified polyesters; vinyl esters such as Dow DERAKANE 411 which is commercially available from Dow Chemical USA of Midland, Mich.; and anhydride or amine-curable epoxy polymers such as EPON® Resin 9310 which is commercially available from Shell Chemical Co.

For pultrusion applications, continuous rovings are typically impregnated in the desired resin mix and pulled through a heated die having a desired profile to cure the composite. Generally, about 50 to about 80 weight percent of glass fiber is used to prepare pultruded products, based on the total weight of the resin matrix and glass fibers.

The present invention will now be illustrated by the following specific, non-limiting example.

EXAMPLE

Each of the components in the amounts set forth in Table 1 was mixed to form an aqueous sizing composition according to the present invention.

TABLE 1

| COMPONENT | WEIGHT OF COMPONENT (GRAMS) PER GALLON OF AQUEOUS SIZING COMPOSITION ON NON-AQUEOUS BASIS | WEIGHT PERCENT OF COMPONENT OF SIZING COMPOSITION ON TOTAL SOLIDS BASIS |
|---|---|---|
| EPI-REZ ® CMD W60-5520[1] | 126.36 | 38.77 |
| EPON ® 880[2] | 67.94 | 34.75 |
| PLURONIC ™ F-108[3] | 10.07 | 5.15 |
| IGEPAL CA-630[4] | 5.08 | 2.60 |

TABLE 1-continued

| COMPONENT | WEIGHT OF COMPONENT (GRAMS) PER GALLON OF AQUEOUS SIZING COMPOSITION ON NON-AQUEOUS BASIS | WEIGHT PERCENT OF COMPONENT OF SIZING COMPOSITION ON TOTAL SOLIDS BASIS |
|---|---|---|
| A-174[5] | 21.9 | 9.30 |
| A-187[6] | 9.12 | 3.78 |
| A-1100[7] | 2.18 | 0.71 |
| EMERY 6717[8] | 0.91 | 0.46 |
| Di-n-Butyl Phthalate | 8.75 | 4.47 |
| Acetic Acid | — | 5.0 |

[1]Non-ionic thermosetting urethane-modified epoxy copolymer commercially available from Shell Chemical Co.
[2]EPON ® 880 epoxy film-forming resin is prepared from bisphenol-A and epichlorohydrin and is commercially available from Shell Chemical.
[3]PLURONIC ™ F-108 condensate of ethylene oxide with hydrophobic bases formed by condensation with propylene oxide iwth propylene glycol is commercially available from BASF Corporation of Parsippany, New Jersey.
[4]IGEPAL CA-630 is an ethoxylated octylphenoxyethanol commercially available from GAF Corporation of Wayne, New Jersey.
[5]A-174 is a gamma-methacryloxypropyltrimethoxysilane which is comercially available from Union Carbide Corp.
[6]A-187 gamma-glycidoxypropyltrimethoxysilane is comercially available from Union Carbide Corp.
[7]A-1100 gamma-aminopropyltriethoxysilane is comercially available from Union Carbide Corp.
[8]EMERY 6717 is a partially amidated polyethylene imine which is commercially available from Henkel Corporation.

One hundred gallons of the above aqueous sizing composition was prepared according to the following procedure. EPON 880, PLURONIC™ F-108, IGEPAL CA-630 and di-n-butyl phthalate were combined in the amounts set forth above and heated to about 140° F. (60° C.) to about 160° F. (71° C.) with thorough mixing. When the desired temperature was obtained, high shear mixing was commenced using an Eppenbach mixer. Deionized hot water (about 120° F. to about 140° F.) (about 49° C. to about 60° C.) in about a 2:1 volumetric ratio of water to mixture was slowly added to the mixture to emulsify the epoxy resin. The A-174, A-187 and A-1100 silanes were hydrolyzed sequentially in water acidified with acetic acid at a ratio of about 1:10 silane to water by weight and added to the main mixture. To this mixture was added 1 gallon of hot water (about 120° F. to about 140° F.) (about 49° C. to about 60° C.) premixed with EMERY 6717 and 20 gallons of water premixed with EPI-REZ® CMD W60-5520. The resulting aqueous sizing composition had a pH of about 4.5 to about 5.5 weight percent solids.

The sizing composition was applied to K-17.3 glass fiber strands after conventional cooling and thermal conditioning by air and water sprays using a conventional roller-type applicator. Each forming package was dried at a temperature of about 220° F. (104° C.) to about 300° F. (149° C.) for about 10–13 hours to form glass strand having about 0.3 to about 2.0 weight percent of dried sizing thereon. After drying, the forming packages were mounted on a creel and transformed into roving.

Pultruded composites were prepared using an isophthalic polyester resin mix and an epoxy resin formulation, each described below, with the required number of tows of roving having the sizing composition of the present invention applied thereto. The components of the isophthalic polyester resin mix are set forth in Table 2 and the components of the epoxy resin formulation are set forth in Table 3.

TABLE 2

| COMPONENT | WEIGHT OF COMPONENT (GRAMS) |
|---|---|
| AROPOL 2036[1] | 10,000 |
| ZELEC UN mold release[2] | 100 |
| ASP ® 400P clay | 1800 |
| Benzoyl Peroxide initiator | 50 |
| PERCADOX 16N initiator[3] | 50 |
| t-Butyl Perbenzoate initiator | 50 |
| Styrene | 50 |

[1]AROPOL 2036 polyester resin formulation (an isophthalic polyester resin) is commercially available from Ashland Chemical Inc. of Columbus, Ohio.
[2]ZELEC UN mold release is commercially available from E.I. du Pont de Nemours & Co. of Wilmington, Delaware.
[3]PERCADOX 16N is a peroxycarbonate initiator commercially available from AKZO Chemical Inc. of Dobbs Ferry, New York.

TABLE 3

| COMPONENT | WEIGHT OF COMPONENT (GRAMS) |
|---|---|
| EPON ® Resin 9310[4] | 11,000 |
| EPI-CURE ® Curing Agent 9360[5] | 3630 |
| Accelerator 537[6] | 73.7 |
| INTEL 1850HT mold release[7] | 73.7 |
| ASP ® 400P clay | 2200 |

[4]EPON ® 9310 is an epoxy resin which is commercially available from Shell Chemical. EPON ® 9310 has a viscosity of 300–550 cp (determined using Shell Test Method HC-397A-87) and a weight per epoxide of 211–224 (determined using Shell Test Method HC-427D-89) (Perchloric Acid Method).
[5]EPI-CURE ® Curing Agent 9360, also commercially available from Shell, is a mixed aromatic amine system modified with a reactive monomer having a viscosity of 100–400 poise (determined using Shell Test Method HC-397A-87) and an Amine Nitrogen Content of 9.3–10.5 weight percent.
[6]EPI-CURE Curing Agent Accelerator 537 is a cure accelerant having a viscosity of 6–70 poise (determined using Shell Test Method HC-397A-87) which is commercially available from Shell Chemical.
[7]INTEL 1850HT mold release is commercially available from Axel Plastics Research Laboratories.

The processing parameters for preparing the pultruded composites are set forth in Table 4.

TABLE 4

| PROCESSING PARAMETER | POLYESTER FORMULATION | EPOXY FORMULATION |
|---|---|---|
| TOWS OF 113 YIELD | 12 | 14 |
| GLASS CONTENT (WT. %) | 70–72 | 74–76 |
| FIRST PLATEN TEMPERATURE (°F.) | 275 (135° C.) | 390 (199° C.) |
| SECOND PLATEN TEMPERATURE (°F.) | 300 (149° C.) | 410 (210° C.) |
| PULL SPEED (INCHES/MIN) | 18 (46 cm/min) | 12 (30 cm/min) |

Pultruded composites using the polyester formulation were evaluated to determine in-plane shear strength according to ASTM D-3846, short beam shear according to ASTM D-2344, flexural shear strength and flexural modulus according to ASTM Method D-790. The results of each of these tests are set forth in Table 5.

TABLE 5

| GLASS CONTENT (WEIGHT PERCENT) | IN-PLANE SHEAR STRENGTH (ksi) | SHORT BEAM SHEAR STRENGTH (ksi) | FLEXURAL SHEAR STRENGTH (ksi) | FLEXURAL MODULUS (ksi) |
|---|---|---|---|---|
| 68.4 | 7.61 | 8.24 | 153.4 | 5986 |
| 72.0 | 6.87 | 7.99 | 160.6 | 6489 |
| 75.2 | 6.66 | 7.47 | 164.1 | 6660 |

Pultruded composites using (1) glass fibers having the sizing composition of the present invention applied thereto (Sample A) or (2) the commercially available 712 and 764 roving products of PPG Industries, Inc. of Pittsburgh, Pa. (Samples B and C, respectively) in the above polyester and epoxy formulations were evaluated to determine average in-plane shear strength according to ASTM D-3846 before and after being subjected continuously for 48 hours to boiling water. The glass content for each of the samples using the polyester formulation was 70–72 weight percent. The glass content for each of the samples using the epoxy formulation was 76–77 weight percent. The average values of in-plane shear strength (derived from multiple runs) are presented in Table 6 for samples using the polyester formulation and Table 7 for samples using the epoxy formulation.

TABLE 6

| SAMPLE | DRY IN-PLANE SHEAR STRENGTH (ksi) | WET IN-PLANE SHEAR STRENGTH (ksi) |
|---|---|---|
| A | 8.2 | 5.6 |
| B | 5.5 | 3.9 |
| C | 3.6 | 2.5 |

TABLE 7

| SAMPLE | DRY IN-PLANE SHEAR STRENGTH (ksi) | WET IN-PLANE SHEAR STRENGTH (ksi) |
|---|---|---|
| A | 8.5 | 8.1 |
| B | 8.6 | 8.1 |
| C | 7.5 | 7.0 |

As shown in Tables 5, 6 and 7, the pultruded composites prepared using glass fibers coated with the sizing composition of the present invention exhibit high in-plane, short beam and flexural shear strength, as well as high flexural modulus. The pultruded composites formed using coated glass fibers of the present invention in the polyester formulation have superior dry and wet in-plane shear strength to those composites prepared using conventional coated glass fibers, as shown in Table 6, and comparable performance in the epoxy formulation, as shown in Table 7.

The aqueous sizing composition of the present invention produces glass fiber strands having high wet-out performance to produce composites having good clarity and high strength when incorporated as reinforcements for thermosetting polymers.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, I claim:

1. An aqueous sizing composition for coating a plurality of glass fibers adapted for reinforcing a thermosetting polymer, the composition comprising:

(a) a non-ionic thermosetting urethane-modified epoxy polymer which is the reaction product of (1) an epoxy and hydroxy functional polyglycidyl ether of a polyhydric alcohol having hydroxyl groups and (2) a polyfunctional isocyanate containing material having isocyanate groups, the polyglycidyl ether and the polyfunctional isocyanate containing material being reacted in the ratio of about 0.01 to about 1.0 isocyanate groups per mole of polyglycidyl ether with the ratio of isocyanate groups to hydroxyl groups in the polyglycidyl ether being no more than one;

(b) a water soluble, dispersible or emulsifiable epoxy film-forming polymer different from the urethane-modified epoxy polymer;

(c) an emulsifying agent;

(d) an organo functional silane coupling agent; and (e) a fiber lubricant.

2. The aqueous sizing composition according to claim 1, wherein the urethane-modified epoxy polymer is present in an aqueous emulsion.

3. The aqueous sizing composition according to claim 1, wherein the urethane-modified epoxy polymer has epoxy and hydroxy functionality.

4. The aqueous sizing composition according to claim 1, wherein the polyglycidyl ether is formed by reacting epihalohydrin with the polyhydric alcohol in the presence of an alkali condensation and dehydrohalogenation catalyst.

5. The aqueous sizing composition according to claim 4, wherein the epihalohydrin is selected from the group consisting of epibromohydrin, dichlorohydrin and epichlorohydrin.

6. The aqueous sizing composition according to claim 1, wherein the polyhydric alcohol is selected from the group consisting of aromatic alcohols, aliphatic alcohols and cycloaliphatic alcohols.

7. The aqueous sizing composition according to claim 6, wherein the aromatic alcohols are dihydric phenols selected from the group consisting of resorcinol, pyrocatechol, and hydroquinone, bis(4-hydroxyphenyl)-1,1-isobutane, 4,4-dihydroxybenzophenone, bis(4-hydroxyphenyl)1,1-ethane, bis(2-hydroxyphenyl)methane, 1,5-hydroxynaphthalene, 4-isopropylidene bis(2,6-dibromophenol), 1,1,2,2 -tetra(p-hydroxy phenyl)-ethane, 1,1,3-tris(p-hydroxy phenyl)-propane, novolac resins, bisphenol F, long-chain bisphenols and bisphenol A.

8. The aqueous sizing composition according to claim 6, wherein the aliphatic alcohols are selected from the group consisting of (1) glycols selected from the group consisting of ethylene glycol, diethylene glycol, triethylene glycol, 1,2-propylene glycol, 1,4-butylene glycol, 2,3-butylene glycol, pentamethylene glycol and polyoxyalkylene glycols; and (2) polyols selected from the group consisting of glycerol, sorbitol, mannitol, 1,2,6-hexanetriol, erythritol and trimethylolpropane.

9. The aqueous sizing composition according to claim 9, wherein the cycloaliphatic alcohol is cyclohexanedimethanol.

10. The aqueous sizing composition according to claim 7, wherein the polyhydric alcohol contains two phenolic hydroxyl groups and is free of other groups reactive with epoxide groups or isocyanate groups.

11. The aqueous sizing composition according to claim 3, wherein the polyfunctional isocyanate containing materials are polyfunctional diisocyanates selected from the group consisting of toluene diisocyanates, phenylene diisocyanates, dianisidine diisocyanate, diisocyanatodiphenyl methane, bis(p-phenyl isocyanate), bis(p-phenyl) methylene diisocyanate, bis(p-phenyl cyclohexyl) methylene diisocyanate, xylylene diisocyanate, naphthalene diisocyanate, cyclohexane diisocyanate, hexamethylene diisocyanate, isophorone diisocyanate, dicyclohexylmethane-4,4'diisocyanate and tetramethylxylylene diisocyanate.

12. The aqueous sizing composition according to claim 1, wherein the urethane-modified epoxy polymer has an epoxide equivalent weight of about 175 to about 4000.

13. The aqueous sizing composition according to claim 1, wherein the urethane-modified epoxy polymer is about 10 to about 60 weight percent of the sizing composition on a total solids basis.

14. The aqueous sizing composition according to claim 1, wherein the epoxy film-forming polymer is an epoxy functional polyglycidyl ether of a polyhydric alcohol.

15. The aqueous sizing composition according to claim 1, wherein the epoxy film-forming polymer is about 10 to about 55 weight percent of the sizing composition on a total solids basis.

16. The aqueous sizing composition according to claim 1, wherein the ratio on a total solids basis of the urethane-modified epoxy polymer to the epoxy film-forming polymer is about 30:70 to about 80:20 by weight.

17. The aqueous sizing composition according to claim 1, wherein the emulsifying agent is selected from the group consisting of polyoxyalkylene block copolymers, ethoxylated alkyl phenols, polyoxyethylene octylphenyl glycol ethers, an ethylene oxide derivatives of sorbitol esters, polyoxyethylated vegetable oils and mixtures thereof.

18. The aqueous sizing composition according to claim 17, wherein the emulsifying agent is a blend of a polyoxyalkylene block copolymer and an ethoxylated alkyl phenol and the ratio of the polyoxyalkylene block copolymer to the ethoxylated alkyl phenol ranges from about 1:1 to about 4:1 by weight.

19. The aqueous sizing composition according to claim 1, wherein the emulsifying agent comprises about 5 to about 25 weight percent of the sizing composition on a total solids basis.

20. The aqueous sizing composition according to claim 1, wherein the organo functional silane coupling agent is selected from the group consisting of gamma-glycidoxypropyltrimethoxysilane, gamma-methacryloxypropyltrimethoxysilane, gamma-aminopropyltriethoxysilane and mixtures thereof.

21. The aqueous sizing composition according to claim 1, wherein the organo functional silane coupling agent comprises about 5 to about 25 weight percent of the sizing composition on a total solids basis.

22. The aqueous sizing composition according to claim 1, wherein the fiber lubricant is selected from the group consisting of an amine salt of a fatty acid, alkyl imidazoline derivative, acid solubilized fatty acid amide and acid solubilized polyunsaturated fatty acid amide.

23. The aqueous sizing composition according to claim 1, wherein the fiber lubricant is about 0.05 to about 0.5 weight percent of the sizing composition on a total solids basis.

24. The aqueous sizing composition according to claim 1, wherein the aqueous sizing composition has a weight percentage of solids of about 1 to about 10.

25. The aqueous sizing composition according to claim 1, further comprising an organic acid to give the aqueous sizing composition a pH of about 3 to about 5.5.

26. The aqueous sizing composition according to claim 1, further comprising a plasticizer selected from the group consisting of polyethylene glycols, alkyl phthalates, alkyl trimellitates and alkyl adipates.

27. The aqueous sizing composition according to claim 26, wherein the plasticizer is 0 to about 10 weight percent of the sizing composition on a total solids basis.

28. A glass fiber having thereon a coating of the dried residue of the sizing composition of claim 1.

29. A glass fiber-reinforced composite comprising the glass fiber strand of claim 28 and a thermosetting matrix material.

30. The glass fiber-reinforced composite according to claim 29, wherein the thermosetting matrix material is selected from the group consisting of polyester, vinyl ester and epoxy materials.

31. An aqueous sizing composition for coating a plurality of glass fibers adapted for reinforcing a thermosetting polymer, the composition comprising: (a) a non-ionic thermosetting urethane-modified epoxy polymer which is the reaction product of (1) an epoxy and hydroxy functional polyglycidyl ether of a polyhydric alcohol having hydroxyl groups and (2) a polyfunctional isocyanate containing material having isocyanate groups, the polyglycidyl ether and the polyfunctional isocyanate containing material being reacted in the ratio of about 0.01 to about 1.0 isocyanate groups per mole of polyglycidyl ether with the ratio of isocyanate groups to hydroxyl groups in the polyglycidyl ether being no more than one; (b) a water soluble, dispersible or emulsifiable epoxy film-forming polymer different from the urethane-modified epoxy polymer, wherein the ratio on a total solids basis of the urethane-modified epoxy polymer to the epoxy film-forming polymer is about 30:70 to about 80:20 by weight; (c) about 5 to about 25 weight percent on a total solids basis of an emulsifying agent; (d) about 5 to about 25 weight percent on a total solids basis of at least one organo functional silane coupling agent; (e) 0 to about 10 weight percent on a total solids basis of a plasticizer; (f) about 0.05 to about 0.5 weight percent on a total solids basis of a fiber lubricant; and (g) water in an amount sufficient to give the aqueous sizing composition a weight percentage of solids of about 1 to about 10.

32. A method of making a reinforcement for a thermosetting polymer, the reinforcement having improved strength, comprising:

(a) applying an aqueous sizing composition to at least a portion of a surface of each of a plurality of glass fibers, the aqueous sizing composition comprising:

(1) a non-ionic thermosetting urethane-modified epoxy polymer which is the reaction product of (1) an epoxy and hydroxy functional polyglycidyl ether of a polyhydric alcohol having hydroxyl groups and (2) a polyfunctional isocyanate containing material having isocyanate groups, the polyglycidyl ether and the polyfunctional isocyanate containing material being reacted in the ratio of about 0.01 to about 1.0 isocyanate groups per mole of polyglycidyl ether with the ratio of isocyanate groups to hydroxyl groups in the polyglycidyl ether being no more than one;

(2) a water soluble, dispersible or emulsifiable epoxy film-forming polymer different from the urethane-modified epoxy polymer;

(3) an emulsifying agent;

(4) an organo functional silane coupling agent;

(5) a fiber lubricant; and (b) drying the aqueous sizing composition to form a plurality of glass fibers having thereon the dried residue of the aqueous sizing composition.

* * * * *